Oct. 7, 1958 E. S. ROBBINS 2,854,693
RETREADING APPARATUS
Filed May 13, 1955 2 Sheets-Sheet 1
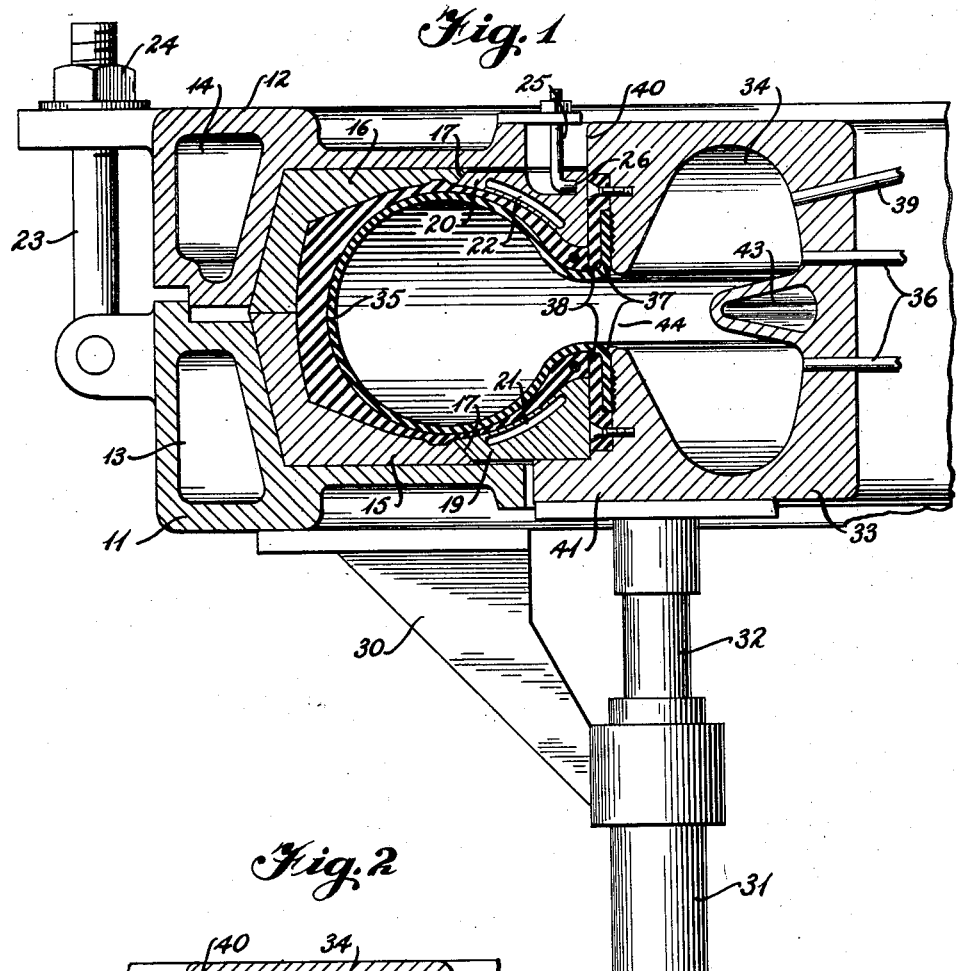
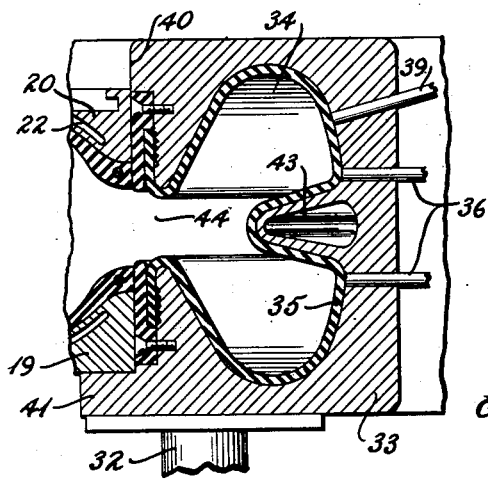
INVENTOR
Edward Stanley Robbins
BY Beale & Jones
ATTORNEYS Oct. 7, 1958  E. S. ROBBINS  2,854,693
RETREADING APPARATUS
Filed May 13, 1955  2 Sheets-Sheet 2

INVENTOR
Edward Stanley Robbins

BY Beale & Jones
ATTORNEYS

United States Patent Office 2,854,693
Patented Oct. 7, 1958

2,854,693

RETREADING APPARATUS

Edward Stanley Robbins, Killen, Ala., assignor, by mesne assignments, to Robbins Tire and Rubber Company, Inc., Tuscumbia, Ala., a corporation of Alabama Application May 13, 1955, Serial No. 508,192

4 Claims. (Cl. 18—18)

This invention relates to a new method and apparatus for recapping or retreading pneumatic tires. Where the term "recapping" is employed, it should be understood that it is employed as a generic term to cover recapping, retreading, and all similar processes wherein camelback or similar material is applied to a tire carcass.

The recapping techniques and apparatus available at present necessitate a considerable amount of hard labor. In addition, conventional recapping apparatus requires very careful attention on the part of operators in order to obtain proper alignment of the tire carcass in the mold.

A principal object of the present invention is to provide recapping apparatus and techniques in which the hard labor involved in the recapping operation is largely eliminated or minimized.

Another important object of this invention is to provide a recapping apparatus in which proper alignment of the tire carcass in the mold is assured by reason of the manner of construction of the apparatus.

Still another important object of this invention is to provide a recapping apparatus in which the bag employed to expand the tire carcass against the mold is a permanent part of the molding apparatus, and is retractively carried in a solid cylindrical member capable of reciprocating motion axially with respect to the tire carcass and the mold.

A further object of the invention is to provide means whereby the inflating bag may be heated continuously in its retracted position in the interval between vulcanizing operations.

Still a further object of the invention is to provide a recapping apparatus in which the recapping time cycle is minimized through the use of high pressure and heated fluid disposed internally of an inflatable bag.

These and many other objects of the present invention are obtained by structural improvements and modifications on the conventional clam-shell molding apparatus. According to this invention, a conventional clam-shell molding apparatus is modified to provide it with sidewall members which are coextensive with the sidewalls of the tire carcass with a firm support during the vulcanizing operation. A special feature of this invention consists of providing these sidewall members with heat exchanging means, in order to prevent the discoloration of white sidewall tires during the recapping operation. In order to enclose the tire carcass completely within the mold during the recapping or vulcanizing operation, a reciprocable cylindrical rim is provided which is capable of axial movement with respect to the clam-shell mold and the tire carcass. The cylindrical rim is desirably provided with a retractable, inflatable bag seating within a recess in the rim. When the rim is properly positioned with respect to the opening between the bead portions of the tire carcass, the bag may be inflated to force it into the tire carcass and into engagement with the interior surface of the tire carcass, thus expanding the tire carcass against the matrices of the mold. Another special feature of this invention is the provision of heating means within the recess in the cylindrical rim. The provision of heating means within the recess has a dual function. The heating means heats the inflatable bag when it is in its retracted position, so that when it is expanded into the tire carcass, there is no lag in the vulcanizing operation caused by the lag in temperature elevation in the inflatable bag itself. In addition, the heating means maintains the temperature of the compressed air in the inflated bag at an elevated temperature, thus preventing heat losses by way of the compressed air. Each of these factors is important in reducing the time elapsed during the ordinary recapping cycle.

These and other features of the invention may be best understood by detailed consideration of the drawings, in which:

Fig. 1 is a partial sectional view of the mold in vulcanizing position;

Fig. 2 is a partial sectional view of the improved mold, showing the cylindrical rim in vulcanizing position, but with the inflatable bag retracted;

Figure 3:
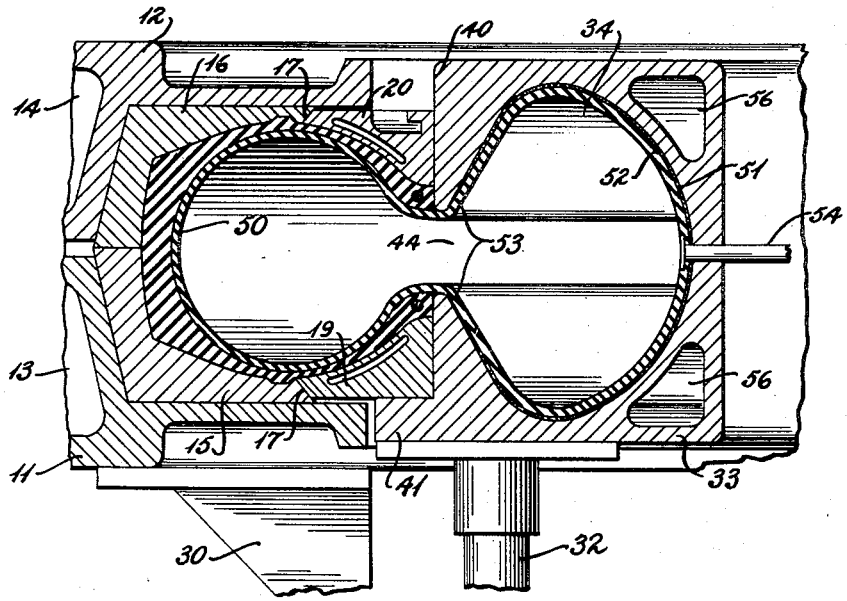
Fig. 3 is a partial sectional view of a modified form of a mold according to the present invention, showing the apparatus in vulcanizing position.
Figure 4:
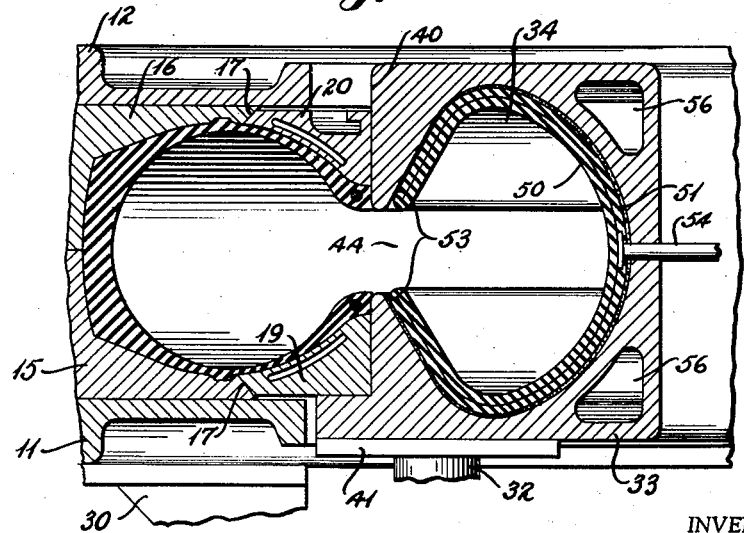
Fig. 4 is a partial sectional view of the apparatus illustrated at Fig. 3, with the inflatable bag in retracted position within its recess.

According to the present invention, the mold may comprise a lower back mold piece 11 and an upper back mold piece 12, each being provided with steam chambers, 13 and 14, in order that the molds may be raised to vulcanizing temperature. The lower back mold piece is desirably provided with a matrix 15 and the upper back mold piece 12 is likewise provided with a matrix 16. Each matrix is modified, according to the present invention, by being foreshortened along a 45° angle to provide a bevel surface 17, so that each matrix embraces only that portion of the carcass to which new rubber is being applied. The bevel surface portion 17 of each matrix provides a supporting surface for the upper and lower sidewall members of the mold, 19 and 20, each of which is provided with beveled surfaces that engage the bevel surfaces 17.

The sidewall members 19 and 20 are desirably provided with an internal surface configuration which follows the exterior contour of the tire carcass. The sidewall members are of sufficient size so that they provide support for the entire sidewall portion of the carcass. In order to prevent discoloration of white sidewall tires during recapping operations, each sidewall member is desirably provided with a heat exchange means through which cold water may be circulated during the vulcanizing operation, for selective cooling of the sidewalls. Thus, the lower sidewall member 19 is provided with a chamber 21, and the upper sidewall 20 is provided with a similar chamber 22. The circulation of cold or relatively cool water through these chambers during the vulcanizing operation selectively cools the sidewalls of the tire carcass and prevents their discoloration.

The lower back mold piece 11 is desirably supported by a supporting skirt or by a conventional hydraulic mechanism (neither of which is shown). In order to resist the expansive force of the inflated bag during the vulcanizing operation, the upper and lower back mold pieces may be secured together by a bolt 23 and a nut 24, as is conventional.

The lower sidewall member 19 will ordinarily remain in place, supported by the lower matrix 15, since it is held in position by its own weight. The upper sidewall member 20 is retained in position against the upper matrix 16 by the positioning of a toed bolt 25 within a step 26 in the upper sidewall member.

Depending downwardly from the lower back mold piece 11, and supported thereby, is a bracket 30. The bracket 30 in turn provides support for a plurality of hydraulic cylinders 31 which are spaced within the central opening in the mold. Each hydraulic cylinder 31 actuates a reciprocal piston 32 and each piston supports the cylindrical rim 33 in axially reciprocable relationship with respect to the vulcanizing mold.

The cylindrical rim 33 is provided with a relatively large recessed area 34, within which there is secured an inflatable bag 35. When the bag 35 is inflated into vulcanizing position, as is shown in Fig. 1, by the passage of compressed air or some other expansive fluid through the passages 36 in the cylindrical rim, its side portions 37 are retained in position on the cylindrical rim by a pair of compression flanges 38, or by some similar expedient. After vulcanization is complete, in order to withdraw the bag 35 into the recess 34, the compressed air may be allowed to escape through a vent 39 in the cylindrical rim, after which, vacuum may be applied through the passage 39, causing the bag 35 to retract within the recess.

The external surface 40 of the cylindrical rim 33 is desirably in very close juxtaposition with the bead portions of the tire carcass. Preferably, the clearance between the sidewall members 19 and 20 and the exterior surface 40 of the cylindrical rim is on the order of approximately 0.030 inch, in order that the lower sidewall member may function, to some extent, as a bearing in guiding the cylindrical member in its axial movements. Proper reciprocating motion of the cylindrical rim 33 is also obtained through the use of a plurality of the hydraulic mechanisms 31 spaced at a number of points around the undersurface of the cylindrical rim. Three such hydraulic mechanisms provide for a very stable and smooth movement of the cylindrical rim.

The cylindrical rim 33 is provided with an exterior flange 41 which rests against the undersurface of the lower sidewall member 19 in normal vulcanizing position. This flange 41 assists the operator of the mold by acting as a stop to indicate when the upward movement of the cylindrical rim should be terminated. In addition, when the vulcanizing operation is completed, and the upper and lower mold halves have been broken apart, an upward movement of the piston 32, and of the cylindrical rim 33, forces the lower sidewall member 19 upward, thus distorting the tire carcass. The lower sidewall member 19 thus functions as a part of an efficient ejector in removal of the carcass from the mold.

The inflatable bag 35 will normally be a relatively heavy, air-tight bag made of a material such as rubber, synthetic rubber, or a synthetic plastic composition. Such materials are very fine insulators, and in ordinary recapping operations, a considerable time delay is encountered because of the time lag required for heating the bag. This lag is largely eliminated by the present invention, since the steam chamber 43 will continuously heat the bag 35 when it is retracted in the recess 34 between vulcanizing operations, as illustrated in Fig. 2. In addition, when the bag 35 is inflated during the recapping operation, steam passing through the chamber 43 in the cylindrical rim 33 will heat the compressed air within the bag, thus minimizing heat losses from the mold and camelback into the compressed air.

The throat area 44 of the recess 34 in the cylindrical rim 33 is desirably sufficiently narrow so that the exterior surface 40 of the cylindrical rim will engage the bead portions of a tire carcass placed within the mold. Since each bead portion of the carcass will abut against the exterior surface 40 of the cylindrical rim in a straight line contact, the carcass will automatically be properly aligned within the mold. This is another advantageous characteristic of the present invention.

In order to recap a tire in the apparatus illustrated in Figs. 1 and 2, a tire carcass is burnished to remove all of the old tread, and camelback is applied in the usual manner. The mold is opened, and the upper and lower mold halves are separated so as to allow the tire carcass to be inserted. In order to facilitate positioning of the carcass within the mold, the cylindrical rim 33 is desirably withdrawn from the mold by downward movement of the hydraulic piston 32. After positioning of the carcass in the lower mold half, the cylindrical rim may be raised into position quite readily. Despite the close clearance between the bead portions of the tire carcass and the exterior surface 40 of the cylindrical rim 33, there is seldom any binding action. The mold may then be closed, and the bolts 23 may be secured around the exterior periphery of the mold by the nuts 24. In order to minimize the time cycle, the upper and lower mold halves and the cylindrical rim are preferably continuously heated by the passage of steam through their heating chambers.

After positioning the tire carcass, with its applied camelback, within the mold, and securing of the upper and lower mold halves together by the bolts 23, the bag 35 is expanded out of the recess 34 and into the tire carcass by the injection of compressed air through the passages 36 in the cylindrical rim. The inflated bag 35 forces the tire carcass and camelback into close engagement with the matrices and the sidewall members, thus imparting a tread design to the crown portion of the tire, and promoting the formation of a good bond between the carcass and the camelback.

Ordinarily, recapping operations are conducted at approximately 125 p. s. i. Because of the tendency of the bag to migrate at this pressure, higher pressures cannot be employed with conventional recapping apparatus. However, with the apparatus of this invention, because the entire tire carcass is firmly supported around its entire outer surface by portions of the mold, higher internal pressures may be employed in the range of about 160 p. s. i. to about 180 p. s. i. The use of higher pressure is desirable since higher pressure promotes the formation of a stronger bond between the camelback and the tire carcass. Conventional temperatures may be employed, although higher temperatures than are normally employed may also be used with the apparatus of this invention, if it is desired to decrease the vulcanizing time. Thus, for example, vulcanizing temperatures of 280° F. to about 310° F. will complete the bonding of the camelback to the carcass in 25 to 30 minutes.

After vulcanizing has been completed, the compressed air is vented through a vent line 39 and then suction is applied through the passage 39 in the cylindrical rim 33. This causes retraction of the inflatable bag into the recess 34 in the cylindrical rim 33. The upper mold half may then be separated from the lower mold half. Invariably, the tire casing will remain with the lower mold half, since any movement would tend to cause binding of the bead portions of the tire carcass on the exterior surface 40 of the cylindrical rim 33. After separation of the mold halves, the cylindrical rim 33 may be caused to move upwardly by the hydraulic piston 32, carrying with it the lower sidewall member 17, which will distort the tire carcass until the carcass is ejected from the lower mold half. After ejection of the tire, the cycle has been completed, and a fresh carcass may be placed in the mold.

In a modification of the invention, the inflatable bag may take the form of a continuous, closed air bag 52 of a heavy rubber or synthetic plastic stock. An outer surface of this air bag 52 may be secured to the inner wall of the recess 34 in the cylindrical rim by a coating of adhesive 51, or by direct vulcanizing of the air bag to the metal. The adhesive coating would desirably extend to a point 53 adjacent the throat area of the recess. The free portion 50 of the inflatable bag would expand into the carcass upon the injection of compressed air through the conduit 54, and would retract into the recess 34 upon the withdrawal of the air through the vent 54. An advantage of this form of air bag is its longer life and freedom from leakage problems. In this form of the invention, steam may be supplied to the cylindrical rim by passage of steam through the steam channels 56 in the cylindrical rim.

The apparatus described above is of particular utility in achieving faster and easier recapping of conventional pneumatic tires, than has been possible heretofore, and of producing stronger bonds between the carcass and the recap material than heretofore produced. It is also useful in recapping tubeless tires, where equally fast and easy recapping may be obtained.

I claim:

1. In a tire tread apparatus for vulcanizing new rubber to a tire, comprising a sectional mold formed with annular mold members that are removably positioned together and that are provided therebetween with a cavity that is adapted to receive a preformed tire that has new rubber applied thereto, said mold including a crown section having a tread-imparting matrix disposed for contact with the new rubber and also having sidewall members extending respectively from said crown section, said mold being formed to mold to the crown and sidewall portions of the tire the new rubber that is applied thereto, the improvement comprising: said mold being formed with a central opening that is cylindrical about an axis that coincides with the axis of said mold cavity and with which said cavity communicates, a unitary rim mounted to reciprocate axially of said mold in and out of said opening, said rim having a pair of peripheral, cylindrical, axially-extending bearing surfaces, said bearing surfaces being spaced from each other axially of said rim and being disposed for engagement respectively with the bead portions of a tire placed in the mold cavity thereby to position the crown of the tire with respect to said crown section of the mold, said rim being formed with a recess between said bearing surfaces, a flexible, airtight bag mounted in said recess and adapted upon inflation to project from said recess and upon evacuation to be withdrawn into said recess, means for reciprocating said rim to align the recess in said rim with the space between the bead portions of a tire in said mold cavity and to align said bead portions, respectively, with said bearing surfaces on said rim, means for injecting fluid under pressure into said bag to force said bag into said tire under pressure and to press said tire against said mold, and means for removing fluid from said bag to withdraw said bag into said recess.

2. The molding apparatus of claim 1, said mold being provided with heat exchange means for heating said tire crown and for cooling said tire sidewalls during vulcanizing.

3. The molding apparatus of claim 1, in which the lower sidewall member of said mold is movable axially of said mold and relative to said crown section, means to retain said lower sidewall member in engagement with said crown section against axial pressure of said tire during vulcanizing, said rim having a flange disposed to engage said lower sidewall member to move said member axially upon axial movement of said rim beyond said position of alignment of said recess and the space between the bead portions of said tire.

4. The molding apparatus of claim 1, said rim including heating means disposed in said recess.

References Cited in the file of this patent

UNITED STATES PATENTS

| | | |
|---|---|---|
| 2,020,023 | Flynn | Nov. 5, 1935 |
| 2,181,273 | Iverson | Nov. 28, 1939 |
| 2,337,857 | Soderquist | Dec. 28, 1943 |
| 2,559,119 | Frank | July 3, 1951 |
| 2,741,799 | Heston | Apr. 17, 1956 |